United States Patent [19]

James

[11] 4,183,195
[45] Jan. 15, 1980

[54] MOUNTING APPARATUS FOR OFFSET MOWER

[75] Inventor: Ronald N. James, Seguin, Tex.

[73] Assignee: Terrain King Corporation, Seguin, Tex.

[21] Appl. No.: 935,797

[22] Filed: Aug. 22, 1978

[51] Int. Cl.² .................... A01D 75/18; A01D 35/00
[52] U.S. Cl. ................................. 56/11.9; 56/10.4
[58] Field of Search ............... 56/10.4, 11.9, 15.9, 56/16.1

[56] References Cited

U.S. PATENT DOCUMENTS

| | | | |
|---|---|---|---|
| 2,729,044 | 1/1956 | Dunn et al. | 56/11.9 |
| 2,732,675 | 1/1956 | Smith et al. | 56/10.4 |
| 2,840,974 | 7/1958 | Dunn et al. | 56/10.4 |
| 3,135,079 | 6/1964 | Dunn | 56/6 |
| 3,221,482 | 12/1965 | Gowling | 56/15.8 |
| 3,236,036 | 2/1966 | Bailey et al. | 56/11.9 |
| 3,472,006 | 10/1969 | Dunn | 56/11.9 |
| 3,526,083 | 9/1970 | Barry et al. | 56/10.4 |
| 3,664,057 | 5/1972 | Dunn | 56/10.4 |
| 3,715,872 | 2/1973 | Thompson, Jr. | 56/11.9 |
| 3,797,211 | 3/1974 | Turner | 56/11.9 |
| 3,857,225 | 12/1974 | Knudson | 56/11.9 |
| 3,949,539 | 4/1976 | Cartner | 56/10.4 |
| 4,048,789 | 9/1977 | Cartner | 56/11.9 |

*Primary Examiner*—Louis G. Mancene
*Assistant Examiner*—Paul J. Hirsch
*Attorney, Agent, or Firm*—Cox & Smith, Incorporated

[57] ABSTRACT

A mower mounting apparatus for mounting an offset mower to a vehicle having a plurality of parallel links pivotally mounted about first pivot axis to maintain the mower at the same inclination upon pivoting of the links to raise and lower the motor and pivotally mounted about second pivot axis lying in vertical planes for horizontal swinging movements of the links to allow rearward non-rotational translation of the mower when the mower strikes an obstacle.

17 Claims, 7 Drawing Figures

MOUNTING APPARATUS FOR OFFSET MOWER

BACKGROUND OF THE INVENTION

This invention relates generally to off-set mowers and more particularly to off-set mowers which are attached to the side of a tractor or other vehicle.

It is known in the prior art to mount a mower or other implement on the side of a tractor or other vehicle for cutting grass or weeds on inclined slopes and inaccessible places. Such a side mounted mowers allow mowing of drainage ditches and the like where a tractor cannot be driven. Such side mounted mowers are used extensively where a conventional rear mounted mower cannot be safely operated.

It is also been known in the prior art to provide a breakaway mechanism to allow the mower to be released upon striking an obstacle to avoid damage to the mower mounting apparatus. Examples of such devices are disclosed in the following U.S. Pat. Nos. 2,729,044; 2,840,974; 3,135,079; 3,472,006; 3,526,083; and 3,664,057. In particular, U.S. Pat. No. 3,472,006 issued to T. J. Dunn discloses a break-away design for a mower which mounts the mower about a generally vertical pivot pin and retains the mower from breaking away or pivoting with a hook member having a detent. When the mower strikes an object, the mower is allowed to rotate about the pivot pin upon overcoming the retaining force of the retaining member. The mower is returned to its operating position through a hydraulic cylinder and a loss motion linkage system. Another example of a releasing or break-away system for a mower is shown in U.S. Pat. No. 3,664,057 also issued to T. J. Dunn. This mechanism also mounts the mower at the distal ends of the linkage system for rotation about a generally vertical axis. A coil-type spring is used to retain the mower in its operating position and to allow rotation of the mower about the vertical pivot axis upon engaging or striking an obstacle. An example of the operation of the pivoting mechanism in U.S. Pat. No. 3,664,057 is shown in U.S. Pat. No. 3,135,079 also issued to T. J. Dunn. In FIG. 12 of U.S. Pat. No. 3135079 the mower is shown rotated about its pivot axis upon engaging an obstacle. The amount of force necessary to affect the break-away mechanism for U.S. Pat. Nos. 3,135,079; 3,472,006 and 3,664,057 is different depending upon the location at which the mower strikes an obstacle. As will be apparent when the mower strikes an obstacle at a lateral most position of the mower there is a large effective lever arm to affect movement of the break-away mechanism. However, when the mower strikes an obstacle positioned much closer to the break-away mechanism, then a larger force will be exerted on the mower due to the greatly decreased effective lever arm. Another type of mower which utilizes a side mounting apparatus are the so-called boom mowers, examples of which are shown in U.S. Pat. Nos. 3,221,482; 3,236,036 and 3,949,539. Each of these patents mounts a boom for rotation about a generally vertical axis and provides a hydraulic cylinder for affecting rotation of the boom. A relief valve is provided in the hydraulic circuitry for the boom rotating cylinder so that when the mower which is attached to the outer end of the boom strikes an obstacle the boom will be allowed to rotate about its pivot axis backwardly to avoid damage to the apparatus.

So far as known, many attempts have been made to solve the long existing problem of providing a safety release for a side mounted mower to prevent damage to the mower when it strikes an obstacle. The known apparatuses discussed above have provided for rotation of the mower about a generally vertical axis in response to the mower striking an obstacle. It is an object of this invention to solve the problems of providing a safety release for a mower which would allow the mower to translate without requiring rotation of the mower to overcome the problems of prior art devices and provide a mower which can be safely and effectively used without damage to the mower.

SUMMARY OF THE INVENTION

A mower mounting apparatus for mounting a mower at the side of a vehicle comprising a plurality of parallel links mounted for pivoting in a generally vertical plane and mounted for pivoting about pivot axes lying in vertical planes. A mower is connected to the outer distal ends of the links so that the mower may be maintained at the same inclination upon raising of the mower through pivoting of the parallel links in vertical planes and to allow non-rotational rearward translation of the mower when the mower strikes an obstacle through pivoting of the parallel links about the pivot axes lying in the vertical planes. A hydraulic break-away cylinder is provided to maintain the links in their normal operating position with a relief valve releasing at a predetermined pressure to allow pivoting of the links when the mower strikes an obstacle. The fluid supply line for the hydraulic cylinder is connected to the fluid inlet line for a valve which controls other hydraulic cylinders so that actuation of any of the other hydraulic cylinders will also actuate the break-away cylinder to return the mower to its operating position after it has been translated rearward by striking an obstacle.

BRIEF DESCRIPSTION OF THE PREFERRED EMBODIMENT

Figure 1:
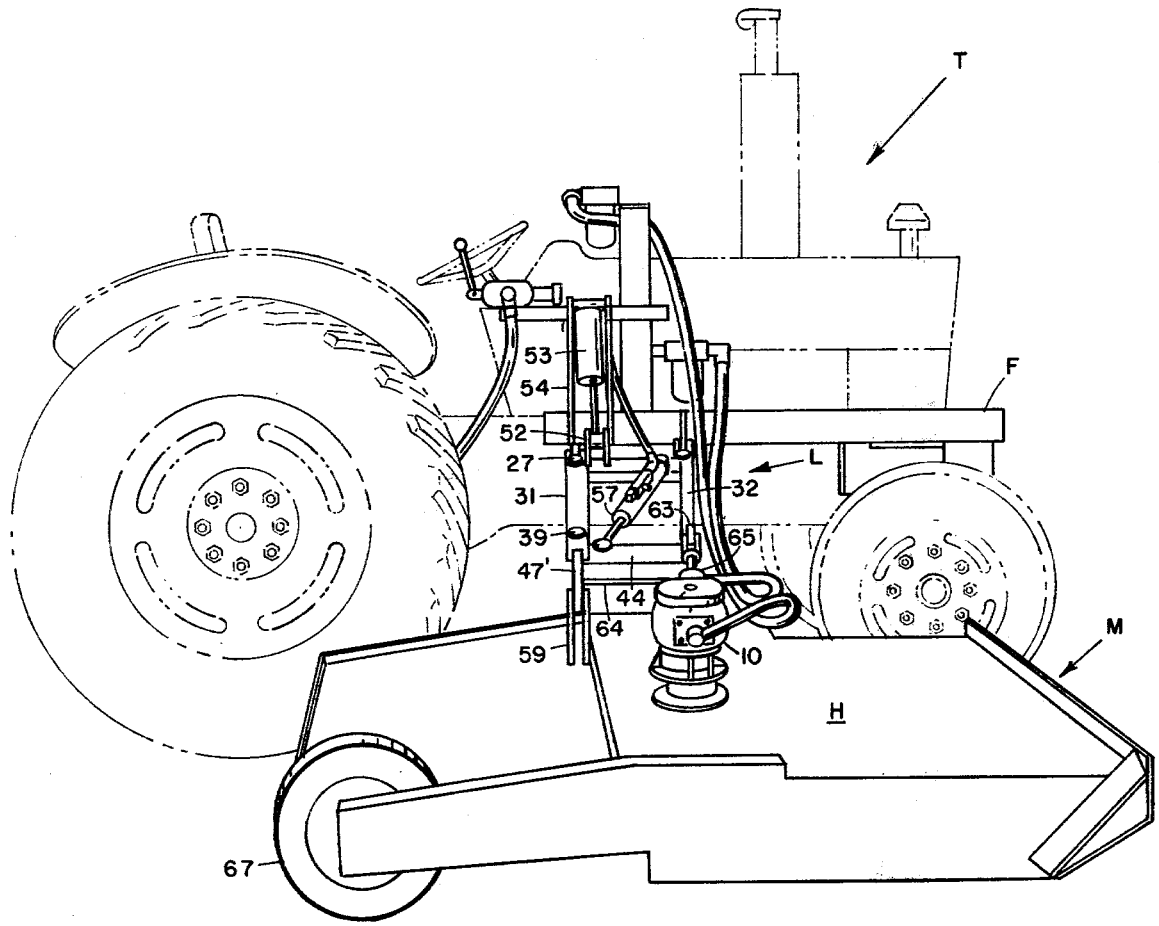
FIG. 1 is a side elevation view showing the mower mounted upon a tractor.

Referring to FIG. 1 of the drawings, there is shown a mowing apparatus M mounted on a tractor T. The tractor T is conventional in construction so no further description is provided. The mowing apparatus M includes a mowing head H which does not form a part of present invention and which could be conventional in structure. The mowing head H is secured to the tractor T with a linkage means L which is shown in greater detail in FIG. 2.

The mowing head L is driven by hydraulic motor 10 which also may be of conventional construction.

Figure 2:
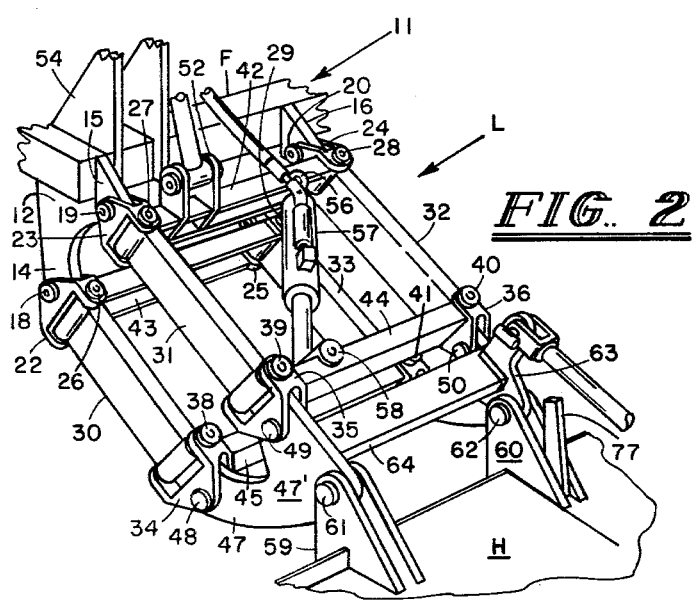
FIG. 2 is a partial view showing the mower mounting apparatus linkage in detail.
Figure 5:
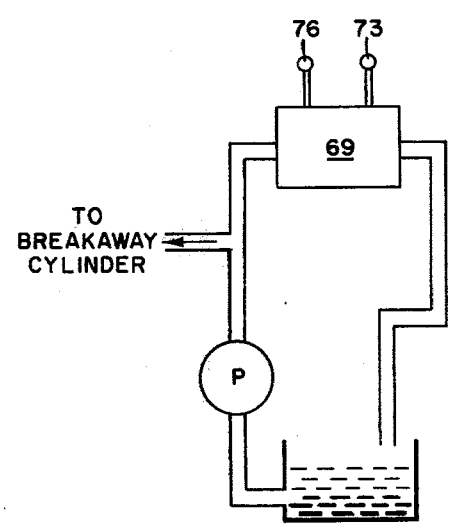
FIG. 5 is a schematic view showing the hydraulic circuitry for the mower mounting apparatus.

Referring to FIG. 2 of the drawing, there is shown in detail the linkage means L which connects the mowing head H to the tractor T. The proximal ends of the linkage means are connected to a frame F which is attached to the tractor T by suitable means. Frame F may take various forms to adapt it to fit different types of tractors. The linkage means L includes a vehicle or tractor connecting means formed by plates 12 and 13 which include either mounting ears 14, 15, 16 and 17. It is understood that each ear includes a longitudinal aperture therein for pivotally receiving pins 18, 19, 20 and 21. Pivotally mounted about the pins 18, 19, 20 and 21 are brackets 22, 23, 24, and 25. Brackets 22, 23, 24 and 25 are free to pivot in vertical planes about the pivot pins 18, 19, 20 and 21 respectively. The brackets 22, 23, 24 and 25 include pivot pins 26, 27, 28, and 29 which lie in vertical planes. Secured to the pivot pins 26, 27, 28 and 29 are parallel links 30, 31, 32 and 33 for pivoting of the parallel links in a plane perpendicular to the vertical planes through which the brackets 22, 23, 24 and 25 and parallel links 30, 31, 32 and 33 pivot.

A plurality of brackets 34, 35, 36 and 37 are secured to the outer distal ends of the links 30, 31, 32 and 33 respectively by pivot pins 38, 39, 40 and 41 respectively which allow the links to pivot relative to the brackets 34, 35, 36 and 37. Connecting bar 42 is rigidly secured to brackets 23 and 24, connecting bar 43 is rigidly secured with the brackets 22 and 25, connecting bar 44 is rigidly secured with the brackets 35 and 36, and connecting bar 45 is rigidly secured to the brackets 34 and 37. The connecting bars 42, 43, 44 and 45 act to maintain their respective brackets to which they are connected rigid relative to each other so that they will pivot together in the vertical planes.

A mower connecting member 47 is secured to the brackets 34, 35 36, and 37 through pivot pins 48, 49, 50 and 51.

A bifurcated bracket 52 is mounted with the connecting bar 42 for attaching hydraulic cylinder 53 thereto. Upstanding brace 54 which is secured with the frame F includes a bracket portion 55 for attaching the other end of the hydraulic cylinder 53. The hydraulic cylinder 53 is of conventional construction and of the single-acting type. As will be apparent, retraction or extension of the hydraulic cylinder 53 will result in pivoting of the brackets and links in vertical planes to affect raising and lowering of the mower connecting member 47. The parallel links will maintain the mower connecting member substantially at the same inclination when it is raised or lowered in the vertical plane. Pivot member 56 on the connecting bar 42 secures a single acting hydraulic cylinder thereto and a second pivot member 58 on the connecting bar 44 secures the other end of the hydraulic cylinder 57 thereto. Accordingly, retraction or extension of the hydraulic cylinder 57 will result in pivoting of the links 30, 31, 32 and 33 about the pivot pins 26, 27, 28 and 29. Such pivoting of the links can result in rearward non-rotational translation of the mower connecting member 47.

Bifurcated brackets 59 and 60 are secured to the mowing head H and secured with the mower connecting member 47 through pivot pins 61 and 62 respectively. An upstanding ear 63 is secured with the connecting bar 44 which rigidly secures plates 47' and 47" which form the mower connecting member 47. The end of a hydraulic cylinder 65 is pivotally secured with the upstanding ear 63 and the other end of the hydraulic cylinder 65 is pivotally secured to an ear 66 which is secured to the mower head H. Accordingly, retraction or extension of the hydraulic cylinder will pivot the mower about the pivot pins 61 and 62 to change the inclination of the mower relative to the mower connecting member. The hydraulic cylinder 65 is of conventional construction and of the single-acting type.

Figure 3:
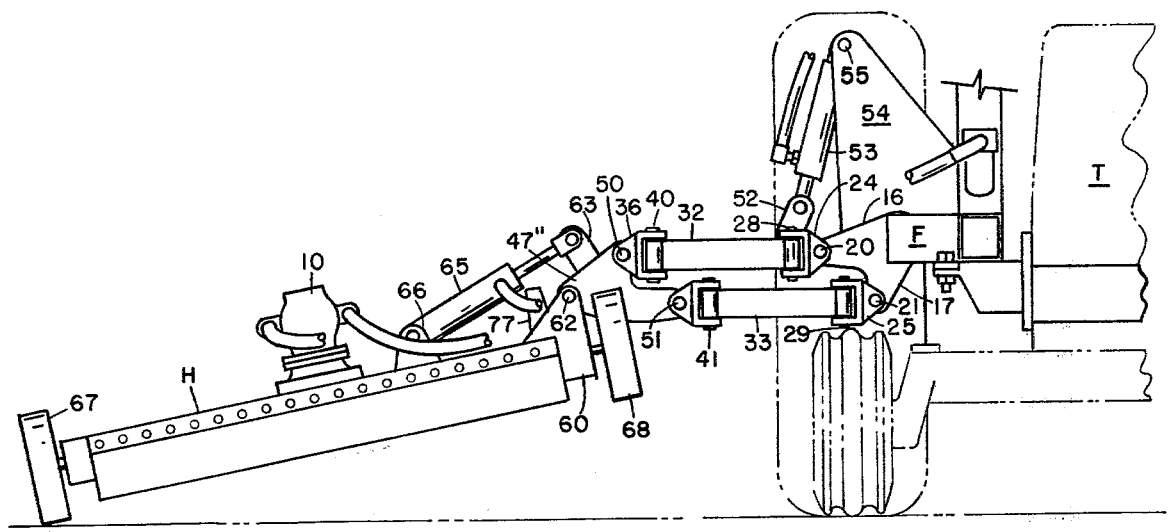
FIG. 3 is a front partial view showing the mower mounting apparatus of the invention connected with the vehicle.

As best shown in FIG. 3, the mower head H includes support wheels 67 and 68 to support the mower when it is lowered for operation.

Figure 6:
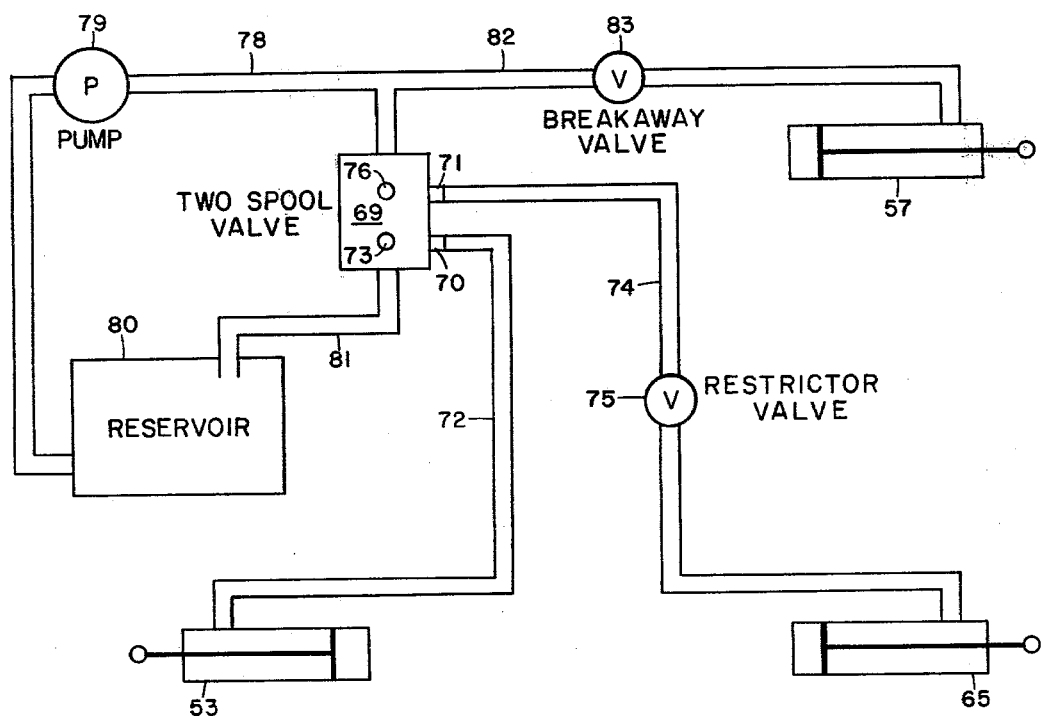
FIG. 6 is another schematic view showing the hydraulic system for the mower mounting apparatus.
Figure 7:
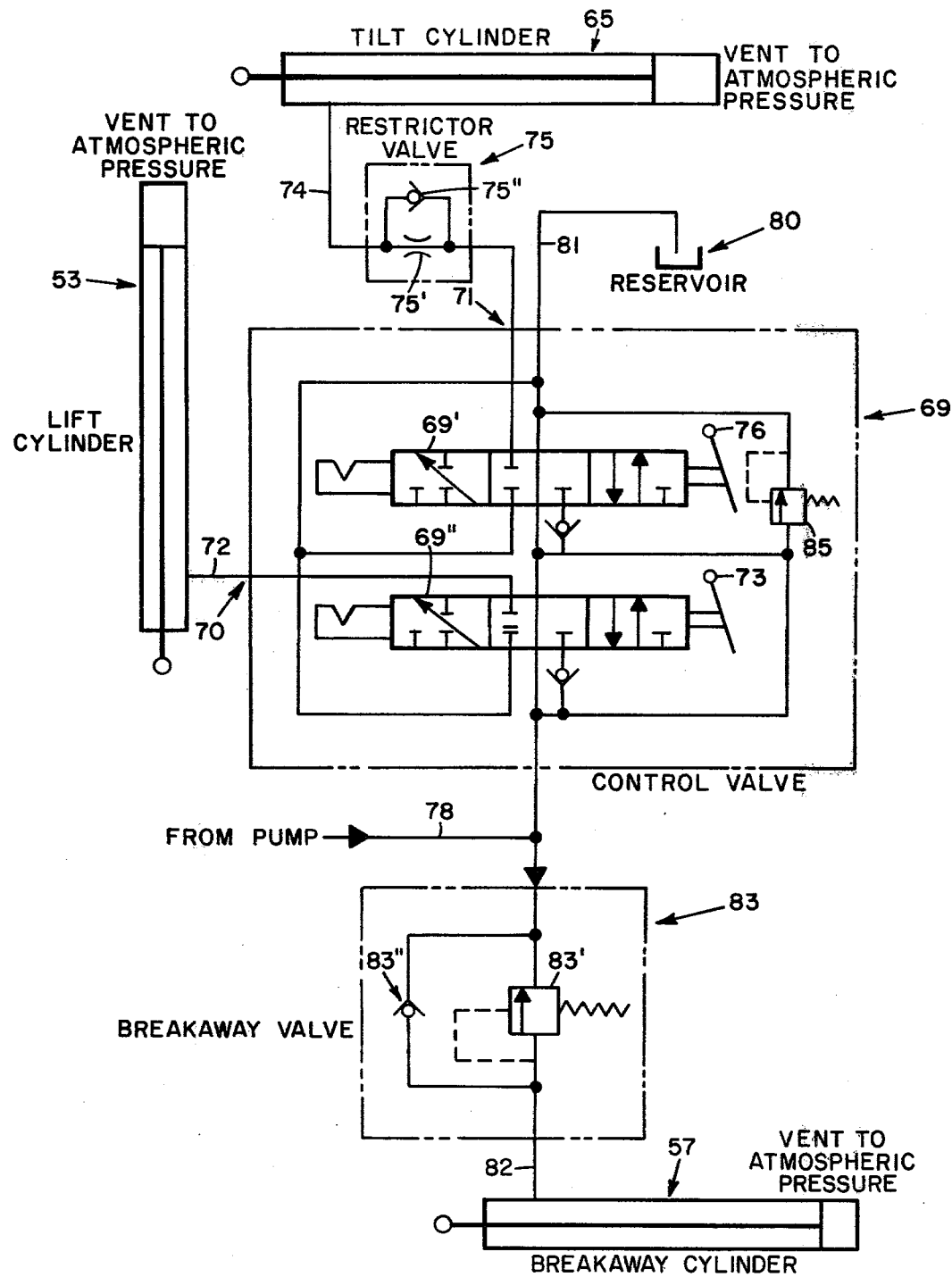
FIG. 7 is a schematic view also showing the hydraulic circuitry for the mower mounting apparatus.

The hydraulic circuitry for the operation of the hydraulic cylinder's 53, 57 and 55 is shown in FIGS. 6 and 7. The hydraulic system includes a conventional two-spool control valve 69 which has reciprocating spools 69' and 69" and which has two outlets 70 and 71. A pressure release means 85 is provided to control the flow of fluid back to the reservoir 80 when the fluid reaches a predetermined pressure. A first hydraulic line 72 is connected to the outlet 70 to supply fluid to the cylinder 53. Actuation of the control lever 73 will move the spool 69" and deliver high pressure fluid to the cylinder 73 to cause it to retract or release fluid from the cylinder to allow it to extend. Operation of the control lever 73 will result in pivoting of the links in vertical planes to lift the mower connecting member and mower head while retaining them at the same inclination. The second outlet 71 is connected to a supply line 74 which includes a restrictor valve 75 to supply hydraulic fluid to hydraulic cylinder 65. The restrictor valve 75 includes a flow restricting means 75' and a bypass check valve 75". Fluid supplied to the cylinder 65 will flow through check valve 75" to quickly actuate the cylinder 65. Fluid released from the cylinder 65 will flow through flow restricting means 75 because the fluid is blocked through check valve 75" to slow lowering of the mower about pivot pins 61 and 62 to a desired position. That reduces shocks to the mower when it is lowered where the wheels 67 and 68 engage the ground. A control lever 76 allows fluid to be supplied to the supply line 74 for retracting the hydraulic cylinder 65 or allows release of fluid from the hydraulic cylinder through the line 74. Actuation of the control valve 76 to move the spool 69' will result in pivoting of the mower head about the pivot axes 61 and 62 to tilt the mower head from a downwardly inclined position to a substantially vertical position where in the stop member 77 will engage the upstanding ear 63.

The reciprocating spools 69' and 69" include detents to maintain the spools in a position to allow fluid not under pressure to flow to and from cylinders 53 and 65. Accordingly, valve 69 can be set to allow the mower to float or ride on wheels 67 and 68 and follow the contour of the ground it is traversing. The mower will maintain its set position when the detents are not engaged.

Two-spool control valve 69 includes a fluid supply line 78 which carries fluid from the pump 79. A reservoir 80 is provided to supply the pump 79 with fluid. Fluid is exhausted from the hydraulic cylinders through the control valve 69 through a return line 81 which returns fluid to the reservoir 80. The fluid supply system including the pump and reservoir which has been described above is of the conventional construction and the pump and reservoir may be formed intergrally with the tractor T.

Hydraulic cylinder 57 is supplied fluid from a fluid supply line 82 through a break-away valve 83 which controls fluid to be exhausted from a cylinder 57 when the fluid in the cylinder reaches a predetermined pressure. The break-away valve 83 includes an adjustable pressure release means 83' which is set to allow flow therethrough when the mower strikes an obstacle and causes cylinder 57 to extend. The pressure release means may also be present and non-adjustable. Check valve 83" allows fluid to freely flow to cylinder 57 to retract it and return the linkage means and mower to their operating position. By connecting the fluid supply line 82 to the fluid supply 78, the need for a three spool valve is eliminated since actuation of either of the control levers 73 and 76 will also act to supply hydraulic fluid to the supply line 82 to retract the cylinder 57 to retain the parallel links in their position as best shown in FIGS. 1 and 2.

Figure 4:
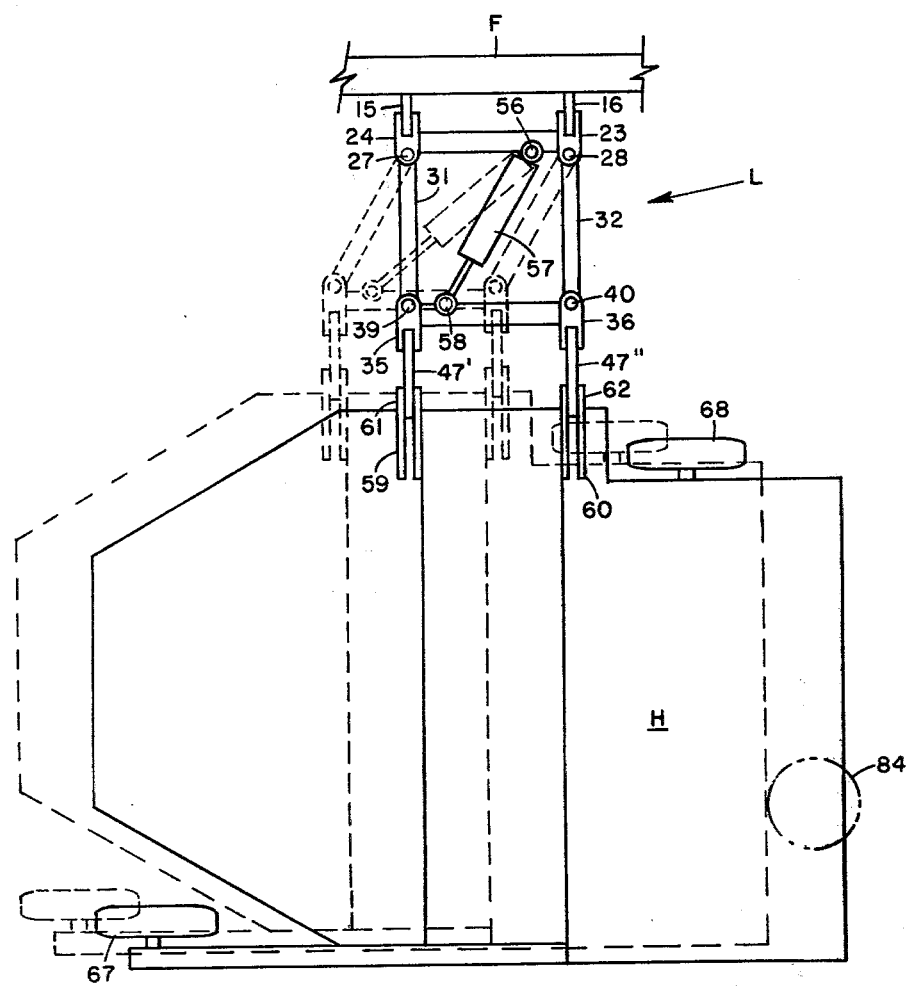
FIG. 4 is a partial top view showing the operation of the mower mounting apparatus when the mower strikes an obstacle.

Referring to FIG. 4 of the drawing, there is shown in broken lines the parallel linkage system and mower as it would appear when it strikes an obstacle 84. When this occurs, the cylinder 57 will be extended to allow the links to be pivoted rearwardly to provide non-rotational rearward translation of the mower head H. As will be apparent, the mower head H is translated rearwardly the same distance regardless of the position which the obstacle 84 strikes the front of the mower head. To return the mower head H to its operating position as shown in FIG. 4, it is only necessary to remove the mower from engagement with the obstacle 84 and actuate either of the control levers 73 or 76 which will supply fluid to the supply line 82 and cause retraction of the cylinder 57 to its fully retracted position. The cylinder 57 will be actuated before cylinders 53 and 65 since it will have the lesser load on it when the mower head is disengaged from an obstacle. The mower is then ready for operation again. During extension of the cylinder 57, a shock absorbing effect is achieved as fluid is forced out of cylinder 57. The mower head can translate rearwardly until cylinder 57 reaches its fully extended position.

While there has been shown and described a preferred embodiment of a Mounting Apparatus for Offset Mower in accordance with the invention, it will be appreciated that many changes and modifications may be made therein without, however, departing from the essential spirit of the invention within the scope of the claims.

I claim:

1. A mower mounting apparatus for mounting a mower at the side of a vehicle, comprising:
    linkage means for connecting with the vehicle pivotally mounted about first pivot means for vertical pivoting movement of the linkage means to raise and lower the mower;
    said linkage means being pivotally mounted about second pivot means for pivoting movement of the linkage means to allow non-rotational rearward translation of said mower connected with the linkage means when the mower strikes an obstacle.

2. The mower mounting apparatus as set forth in claim 1, wherein:
    the linkage means includes a mower connecting means secured to the outer distal portion of the linkage means by the first pivot means for securing said mower thereto.

3. The mower mounting apparatus as set forth in claims 1 or 2, wherein:
    the linkage means includes hydraulic cylinder means to retain the linkage means from horizontal pivoting movement about the second pivot means.

4. The mower mounting apparatus as set forth in claim 1, wherein:
    the linkage means includes a hydraulic cylinder to effect vertical swinging movement of the linkage means about the first pivot means.

5. The mower mounting apparatus as set forth in claim 2, wherein:
    the mower connecting means includes third pivot means for connecting said mower thereto for vertical swinging movement of the mower about the third pivot means.

6. The mower mounting apparatus as set forth in claim 5, wherein:
    the linkage means includes a hydraulic cylinder to effect vertical swinging movement of the mower about the third pivot means.

7. The mower mounting apparatus as set forth in claim 1, wherein:
    the linkage means includes upper and lower parallel links.

8. The mower mounting apparatus as set forth in claim 1, wherein:
    the linkage means includes a vehicle connecting means secured to the inner proximal portion of the linkage means for securing to a vehicle.

9. The mower mounting apparatus as set forth in claim 3, wherein:
    the hydraulic cylinder means includes a relief valve to allow fluid to be displaced from the hydraulic cylinder means at a predetermined pressure upon horizontal pivoting movement of the linkage means when the mower strikes an obstacle.

10. The mower mounting apparatus as set forth in claims 4 or 6, including:
    a two spool hydraulic control valve to regulate fluid supplied to the hydraulic cylinder.

11. The mower mounting apparatus as set forth in claim 1, wherein:
    the linkage means includes a first hydraulic cylinder to effect the pivoting movement about the first pivot means and a second hydraulic cylinder to retain the linkage means from pivoting movement about the second pivot means;
    a hydraulic control valve having a fluid supply line to regulate fluid to the first hydraulic cylinder; and
    said second hydraulic cylinder having a second fluid supply line connected to the hydraulic control valve fluid supply line whereby actuation of the hydraulic control valve to regulate the first hydraulic cylinder will automatically supply fluid to the second hydraulic cylinder.

12. The mower mounting apparatus as set forth in claim 11, wherein;
    the second fluid supply line has a relief valve to allow fluid flow at a predetermined pressure through the second supply line when the linkage means is pivoted to allow non-rotational translation of the mower when the mower strikes an obstacle.

13. The mower mounting apparatus as set forth in claim 1, wherein:
    the linkage means includes upper and lower parallel links to maintain the mower at the same inclination upon pivoting of the linkage means about the first pivot means.

14. A mower mounting apparatus for mounting a mower at the side of a vehicle, comprising:
    a vehicle connecting means for securing to the side of a vehicle;
    a plurality of vehicle connecting brackets secured with the vehicle connecting means for vertical pivoting movement of the brackets in a vertical plane;

a plurality of parallel links pivotally mounted at their proximal ends with the brackets for vertical pivoting of the links with the brackets and for pivoting movement of the links relative to the vehicle connecting brackets in a second plane perpendicular to the vertical plane.

a plurality of mower connecting brackets pivotally mounted at the distal ends of the links for pivoting movement of the links relative to the mower connecting brackets in the second plane; and said mower connected with the mower connecting brackets to allow non-rotational rearward translation of the mower through pivoting of the links in the second plane when the mower strikes an obstacle.

15. The mower mounting apparatus as set forth in claim 14, including:

a first hydraulic cylinder to effect pivoting movement of the brackets and links in the vertical plane; and a second hydraulic cylinder to retain the links from pivoting movement in the second plane.

16. The mower mounting apparatus as set forth in claim 15, including:

a hydraulic control valve having a fluid supply line to regualte fluid to the first hydraulic cylinder; and said second hydraulic cylinder having a second fluid supply line connected to the hydraulic control valve fluid supply line whereby actuation of the hydraulic control valve to regulate the first hydraulic cylinder will automatically supply fluid to the second hydraulic cylinder.

17. The mower mounting apparatus as set forth in claim 16, wherein:

the second fluid supply line has a relief valve to allow fluid flow at a predetermined pressure through the second supply line when the plurality of links are pivoted to allow non-rotational translation of the mower when the mower strikes an obstacle.

* * * * *